United States Patent [19]

Shin et al.

[11] Patent Number: 5,535,309

[45] Date of Patent: *Jul. 9, 1996

[54] SINGLE LAYER NEURAL NETWORK CIRCUIT FOR PERFORMING LINEARLY SEPARABLE AND NON-LINEARLY SEPARABLE LOGICAL OPERATIONS

[75] Inventors: Yong-Chul Shin, Amherst; Ramalingam Sridhar, East Amherst, both of N.Y.

[73] Assignee: The Research Foundation, State University of New York at Buffalo, Buffalo, N.Y.

[ * ] Notice: The term of this patent shall not extend beyond the expiration date of Pat. No. 5,355,436.

[21] Appl. No.: 289,055

[22] Filed: Aug. 11, 1994

Related U.S. Application Data

[63] Continuation of Ser. No. 957,099, Oct. 5, 1992, Pat. No. 5,355,436.

[51] Int. Cl.$^6$ ................................................ G06F 15/18
[52] U.S. Cl. .................................. 395/24; 395/27
[58] Field of Search ................................. 395/23, 24, 27

[56] References Cited

U.S. PATENT DOCUMENTS

| | | | |
|---|---|---|---|
| 3,735,403 | 5/1973 | Sykes | 342/158 |
| 4,237,737 | 12/1980 | Nitadori | 73/625 |
| 4,747,150 | 5/1988 | Knutsson et al. | 382/21 |
| 4,904,881 | 2/1990 | Castro | 395/24 |
| 4,954,963 | 9/1990 | Penz et al. | 395/22 |
| 4,979,124 | 12/1990 | Sachse et al. | 395/22 |
| 4,979,126 | 12/1990 | Pao et al. | 395/24 |
| 4,994,982 | 2/1991 | Duranton et al. | 395/27 |
| 4,999,525 | 3/1991 | Park et al. | 395/24 |
| 5,040,214 | 8/1991 | Grossberg et al. | 395/22 |
| 5,043,913 | 8/1991 | Furtani | 395/27 |
| 5,052,043 | 9/1991 | Gabroski | 395/23 |
| 5,075,889 | 12/1991 | Jousselin et al. | 395/27 |
| 5,083,044 | 1/1992 | Mead et al. | 395/24 |
| 5,083,285 | 1/1992 | Shima et al. | 395/24 |
| 5,087,826 | 2/1992 | Holler et al. | 395/24 |
| 5,097,141 | 3/1992 | Leivian et al. | 395/27 |
| 5,103,431 | 4/1992 | Freeman et al. | 395/22 |
| 5,131,072 | 7/1992 | Yoshizawa et al. | 395/24 |
| 5,161,203 | 11/1992 | Buckley | 395/20 |
| 5,261,035 | 11/1993 | Adler | 395/24 |
| 5,355,436 | 10/1994 | Shin et al. | 395/24 |

OTHER PUBLICATIONS

De Sovigny et al, "Realization of Boolean Functions Using A Pulse Coded Neuron", 1992 IEEE Int'l Symposium on Circuits & Systems, May 10–13 1992, pp. 2229–2231 vol. 5.

Hirose, "Dynamics of Fully Complex–valved Neural Networks", Electronics Letters, Jul. 30, 1992 vol. 28 No. 16.

Leung and Haykin, "The Complex Backpropagation Algorithm", IEEE Transactions on Signal Processing, vol. 39, No. 9, 1991, Sep. 1991, pp. 2101–2104.

Benvenuto et al., "A Comparison between Real and Complex Valued Neural Networks in Communication Applications", Artificial Neural Networks, Elsevier Science Publishers, BV (North–Holland), pp. 1177–1180, (1991).

Little et al, "Generalization of the Backpropagation Neural-Network Learning Algorithm to Permit Complex Weights", Applied vol. 29, No. 11, Apr. 10, 1990, pp. 1591–1592.

Kim and Guest, "Modification of Backpropagation Networks for Complex–Valued Signal Processing in Frequency Domain," IJCNN, Jun. 1990, pp. III–27–III–31.

(List continued on next page.)

*Primary Examiner*—Robert W. Downs
*Attorney, Agent, or Firm*—Nixon, Hargrave, Devans & Doyle

[57] ABSTRACT

A neural network provides both linearly separable and non-linearly separable logic operations, including the exclusive-or operation, on input signals in a single layer of circuits. The circuit weights the input signals with complex weights by multiplication and addition, and provides weighted signals to a neuron circuit (a neuron body or some a) which provides an output corresponding to the desired logical operation.

15 Claims, 7 Drawing Sheets

OTHER PUBLICATIONS

Widrow et al., "The Complex LMS Algorithm", Proceedings of the IEE, Apr. 19, 1975, pp. 719–720.

Rumelhart et al., "Learning Representations by Backpropagating Errors", Nature No. 323, pp. 533–536, 1986.

Rumelhart et al., "Learning Internal Representations by Error Propagation", from Parallel Distributed Processing: Explorations in Micro Structures of Cognition, vo. 1, MIT Press, 1986, pp. 318–362.

W. McCulloch and W. Pitts, "A Logical Calculus of the Ideas Immanent in Nervous Activity", Bulletin of Mathematical Biophysics, vol. 5, 1943, pp. 115–133.

J. Anderson and E. Rosenfeld, "Neurocomputing: Foundations of Research", The MIT Press, 1988.

R. Hecht–Nielson, "Neurocomputing", Addison–Wesley, 1989, pp. 17–18.

Widrow, et al., "Learning Phenomena in Layered Neural Networks", IEEE First Inter. Conf. on Neural Networks, 1987, pp. II–411–II429.

Lippmann, "An Introduction to Computing With Neural Nets", IEEE ASSP Magazine, Apr. 1987, pp. 4–22.

FIG. 3(a)    A HARD LIMITING THESHOLD

FIG. 3(b)    A SIGMOIDAL THESHOLD

| $x_1$ | $y$ | $z$ |
|---|---|---|
| 0 | 1 | 1 |
| 1 | 0 | 0 |

Figure 11:
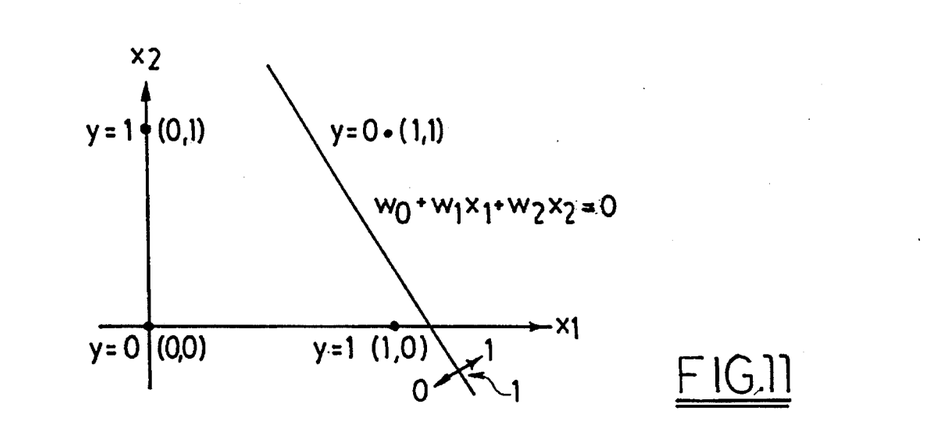
FIG. 11 is an $x_1$–$x_2$ plane having a hyperplane.

TRUTH TABLE

though 1 is incapable of separating the $x_1$–$x_2$ plane into a pair of half planes having (0,1) and (1,0) (which yields an XOR result of 1) on one side of the hyperplane, and (0,0) and (1,1) (which yields an XOR result of 0) on the other.

SINGLE LAYER NEURAL NETWORK CIRCUIT FOR PERFORMING LINEARLY SEPARABLE AND NON-LINEARLY SEPARABLE LOGICAL OPERATIONS

This is a continuation of application Ser. No. 07/957,099 filed on Oct. 5, 1992, now U.S. Pat. No. 5,355,436.

The present invention relates to artificial neural network circuits, and more particularly to a circuit which uses complex weights to perform linearly separable or non-linearly separable logical operations in a single layer.

BACKGROUND OF THE INVENTION

A single neuron network, which may be configured in a single layer is known as a perceptron. In general, a perception accepts multiple inputs, multiplies each by a weighty, sums the weighted inputs, subtracts a threshold, and limits the resulting signal, such as by passing it through a hard limiting nonlinearity. A perception is described in W. McCulloch and W. Pitts, "A Logical Calculus of the Ideas Immanent in Nervous Activity", *Bulletin of Mathematical Biophysics*, Vol. 5, pp. 115–133, 1943. This perceptron was not itself useful until combined into multiple perceptron networks known as artificial neural networks. Such networks generally comprised interconnected perception layers having multiple input, intermediate and output neurons. For an example of such networks, see the text by J. Anderson and E. Rosenfeld, *Neurocomputing: Foundations of Research*, the MIT Press, 1988. Artificial neural networks currently are used in such applications as pattern recognition and classification.

While it is known to perform linearly separable functions using single layer neural networks, one shortcoming of such networks is that they heretofore have been thought to be inherently incapable of performing non-linearly separable functions. Specifically, it has been established that a two-input, single-layer, single-neuron network cannot implement such non-linearly separable functions as the exclusive-or ("XOR") and exclusive-nor functions ("XNOR"). See R. Hecht-Nielsen, *Neurocomputing*, 17–18, Addison-Wesley, 1989.

The rationale for the belief that single-layer neural networks incapable of performing non-linearly separable functions can be seen by examining the characteristics of a conventional neural network. Such a conventional neural network having two inputs, $x_1$ and $x_2$, can be represented by a hyperplane off $w_1 x_1 + w_2 x_2 - \theta = 0$, where $w_1$ and $w_2$ are weights applied to inputs $x_1$ and $x_2$ before application to the neuron, and $\theta$ is a threshold. The decision region in the $x_1$–$x_2$ plane, i.e., the region containing input coordinates which yield a common output, is only a half-plane bounded by the hyperplane. A logical function is said to be linearly separable if it conforms to the hyperplane criterion, i.e.., all input pairs having coordinates on one side of the hyperplane yield one result and all inputs with coordinates on the other side yield a different result. Because there is no single straight line subdividing the $x_1$–$x_2$ plane, such that the inputs (0,0) and (1,1) will fall on one side of the hyperplane and thus yield a logical zero, and (0,1) and (1,0) on the other to yield a logical one, it was supposed that no combination of values for $w_1$ and $w_2$ will produce the input/output relationship of the XOR function for a single layer neural network. That is to say, the XOR function is a non-linearly separable function.

FIG. 11 shows the geometry of the plane/hyperplane discussed above. It can be seen that hyperplane 1 is inca- The XOR operation is a common one in neural networks. To implement it, however, has required the use of multiple layers of neural networks. To reduce the number of components and hence the cost of networks, a need has arisen for a single layer neural network which can be trained to perform the XOR operation, as well as other non-linearly separable and separable operations, on one or more input signals.

SUMMARY OF THE INVENTION

It is an object of the present invention to provide a neuron circuit which can perform both linearly and nonlinearly separable logical operations using fewer layers of components than are currently required.

It is a further object of the present invention to provide a single layer neural network circuit which can perform such non-linearly separable logical operations as XOR and XNOR.

A single layer, single artificial neuron circuit for performing linearly separable and non-linearly separable logical operations on one or more input signals in accordance with the invention includes synapse means for receiving the input signals and weighting the input signals with one or more complex weights to form a plurality of weighted input signals. The complex weights each have a real component and an imaginary component. The values of the real and imaginary components determine the logical operation to be performed on the one or more input signals. The circuit also includes neuron means for receiving the weighted input signals: and producing a resultant electrical signal reflecting (corresponding to) the logical operation on the one or more input signals.

DETAILED DESCRIPTION

Figure 1:
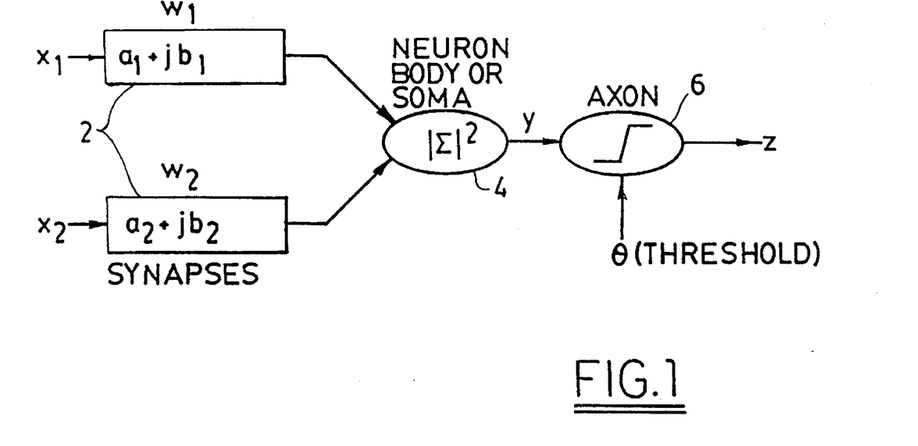
FIG. 1 is a block-diagram of a single-layer, two-input neural network in accordance with the present invention.

FIG. 1 shows a neural network having a plurality of inputs, with two inputs, $x_1$ and $x_2$, being specifically shown. The inputs are electrical signals, analog or digital, upon which the desired-logical function will be performed. These two inputs are applied to synapses 2, where they are multiplied by weights $w_1$ and $w_2$, respectively. The weights are complex and are of the form $w_n = a_n + jb_n$. The factors a and b are the values of the real and imaginary components of the complex weight, respectively. The weighted signals are then applied to a neuron body 4. The neuron circuit, also called a neuron body or soma, 4 performs an operation on the weighted input signals to produce an intermediate output y. The output y is obtained by squaring the magnitude of the sum of the weighted input signals. To achieve neuron output z of desired value for a given set of inputs, the intermediate output y is applied to a thresholding circuit 6. If a hard limiting nonlinear threshold is used, the neuron output z will be a logical 1 for all inputs y above a predetermined threshold amplitude and a logical 0 for all other inputs y (below the threshold). If a sigmoidal non-linear threshold is used, the neuron output z will be an analog value between 0 and 1.

Figure 2:
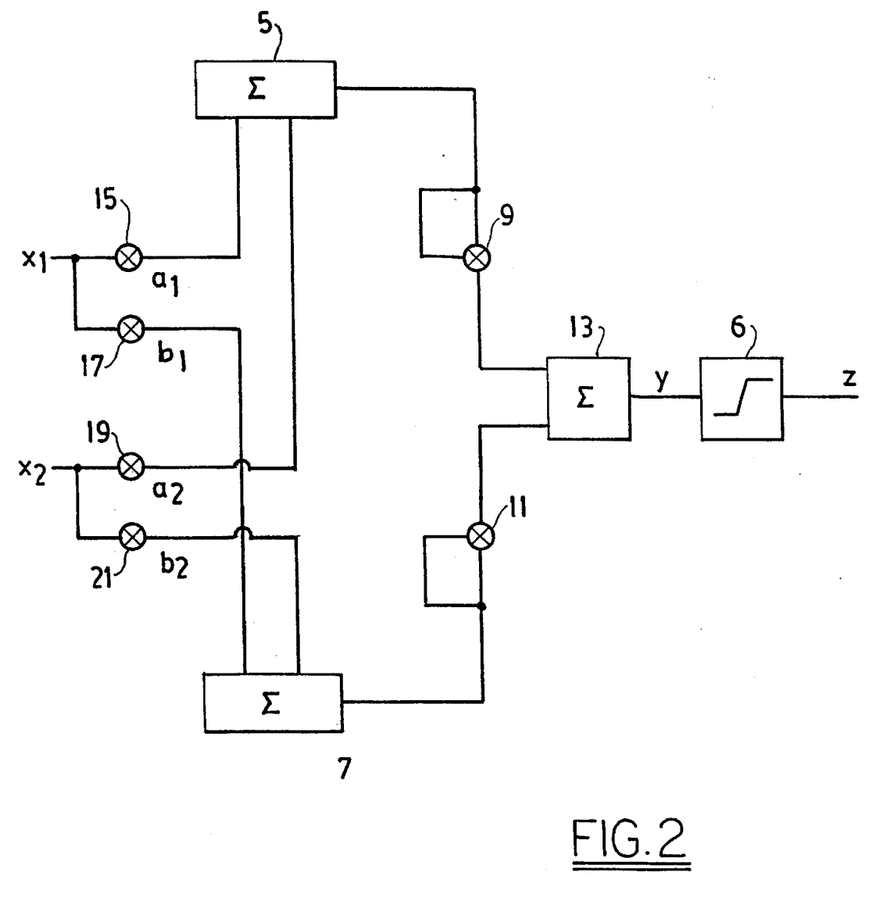
FIG. 2 is a block diagram of an implementation of a two-input, single-layer neural network in accordance with the present invention.
Figure 6:
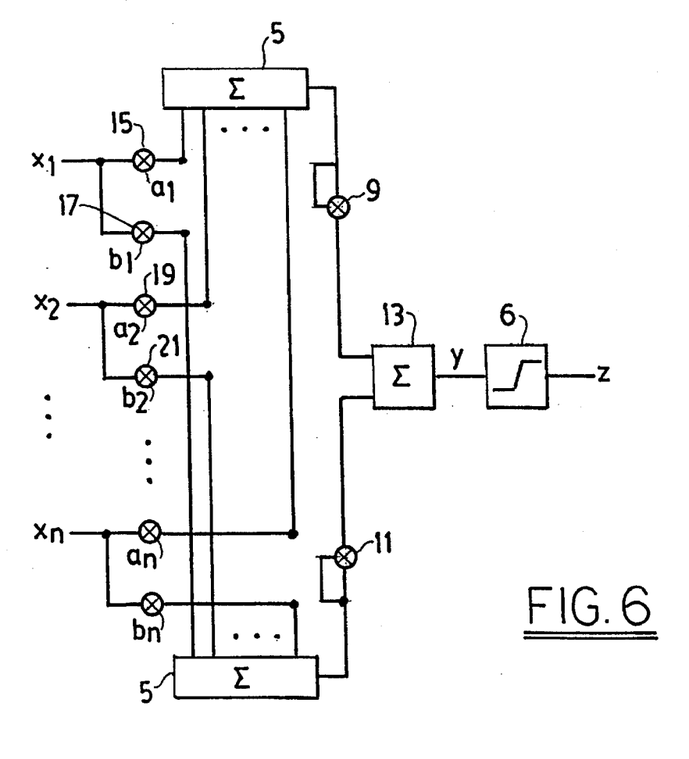
FIG. 6 is a generalized block diagram of a neural network in accordance with the invention which is capable of accepting an unlimited number of inputs.

A discussion of the hardware implementation of the neural network of the present invention is now presented. FIG. 2 shows a preferred embodiment of the single layer neural network circuit for performing the XOR. As can be seen, inputs $x_1$ and $x_2$ each are applied to a separate input line. Each signal is split, and using a known multiplying device such as an Add-Shift multiplier (in digital design) or a Gilbert multiplier (in analog -design), is multiplied with real-valued weights $a_1$, $b_1$, $a_2$ and $b_2$, by means of multipliers 15, 17, 19, and 21 respectively. Each of the real-valued weights represents the real or imaginary component of its associated complex weight. To implement the neuron body 4 shown in FIG. 1, summers 5 and 7, multipliers 9 and 11, and summer 13 can be used as shown in FIG. 2. The weighted inputs corresponding to the real and imaginary portions of the complex weights are added separately,, That is, the input signals weighted by the real portions of the complex weights are added by summer 5 and the input signals weighted by the imaginary portions of the complex weights are added by summer 7. Summers 5 and 7 preferably are carry-lookahead adders (in digital design) or a Kirchhoff adder (in analog design), but any suitable signal summing means will suffice. Each of the summed signals is then squared by first duplicating each summed signal and then applying them to multipliers 9 and 11. These multipliers preferably are either an Add-Shift multiplier (in digital design), or a Gilbert multiplier (in analog design), but any suitable multiplication device will suffice. Finally, the resultant products are added by summer 13, the output of which is the signal y. Summer 13 preferably is a carry-lookahead adder (in digital design), or a Kirchhoff adder (in analog design), although any suitable summing means will suffice. The circuit of FIG. 1 is shown generally in FIG. 6, for the case of more than two inputs. The operation of the circuit of FIG. 6 is identical to that of the circuit of FIG. 2.

Complex weights are meant to include two dimensional weights with real and imaginary components and an alternative two dimensional weight having two real components.

The non-linear separability problem which heretofore has prevented the implementation of such functions as XOR and XNOR by means of a single layer neural network is solved in accordance with the invention by using complex weights. Although complex weighting is used, the operation performed by neuron circuit 4 is implemented using real-valued electronic components. To achieve this without loss of generality, the square of the magnitude of the sum ("square of sum") of the weighted inputs is used. The output y can be obtained by multiplication in the synapses 2 and summing the squares of the synapse outputs. These operations can be expressed mathematically as follows:

$$y = |x_1(a_1 + jb_1) + x_2(a_2 + jb_2)|^2. \tag{1}$$

Expanding, $$y = (x_1 a_1 + x_2 a_2)^2 + (x_1 b_1 + x_2 b_2)^2 \tag{2}$$

As can be seen, the imaginary number drops out of equation (1) and, hence, equation (2) can be considered the transformation of (1) into an expression which includes only real numbers.

With properly selected weights derived analytically or through training, the resultant signal y from neuron body 4 reflects the desired logical operation, e.g., XOR, XNOR, etc., for a given set of inputs. To convert the value of y to logical 1 or logical 0, the following hard limiting function is employed:

$$z = f(y) = 1, \text{ if } y > 0$$

0, otherwise

Figure 3A:
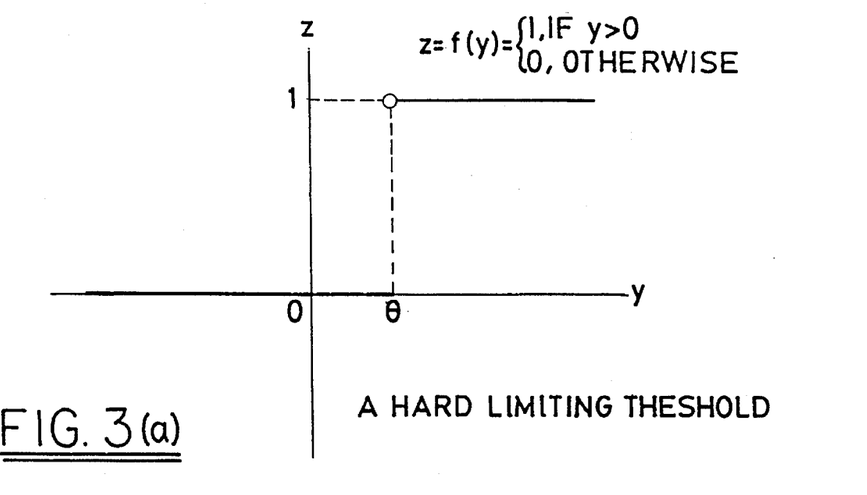
FIG. 3(a) is a characteristic curve of the threshold operation performed by a hard limiting threshold.
Figure 3B:
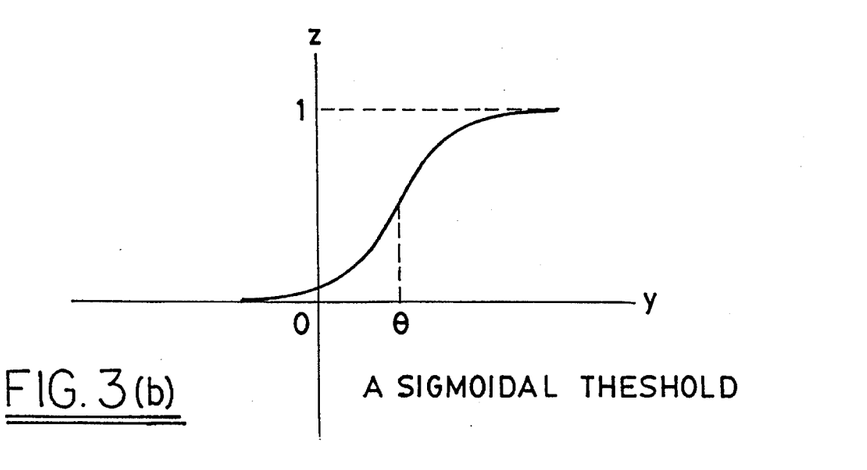
FIG. 3(b) is a characteristic curve of the sigmoid operation performed by a sigmoidal threshold.
Figure 13A:
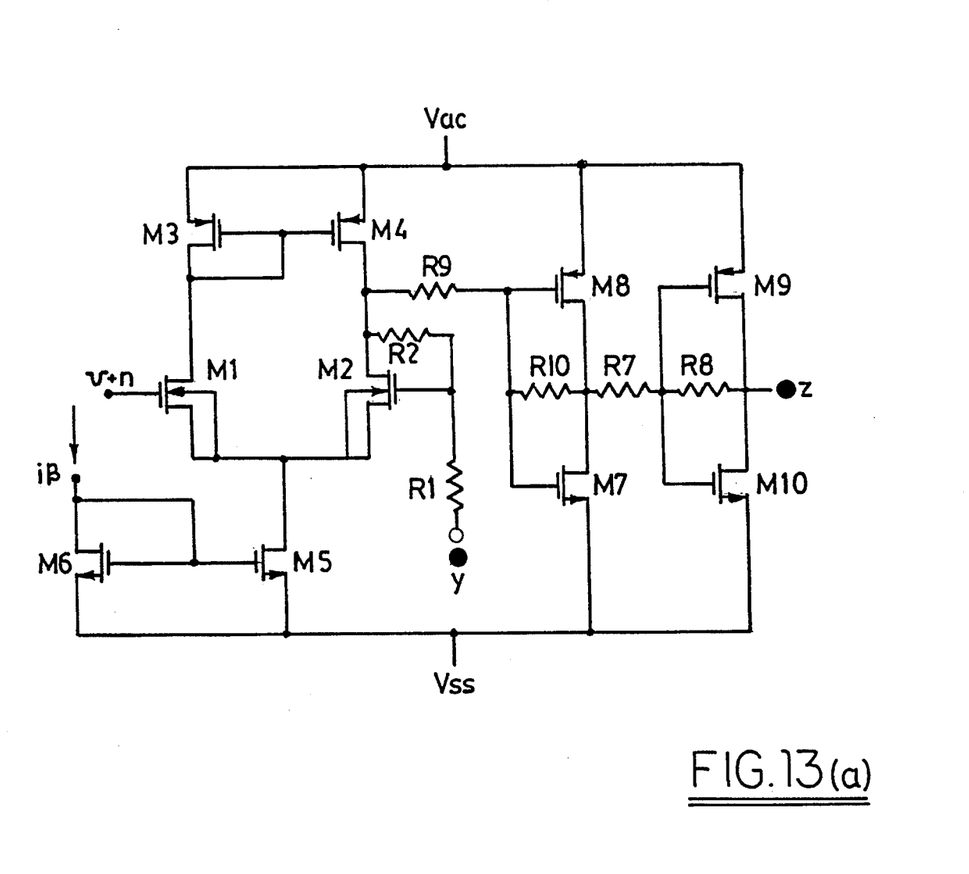
FIG. 13(a) is a circuit implementing a squashing coefficient and threshold.
Figure 13B:
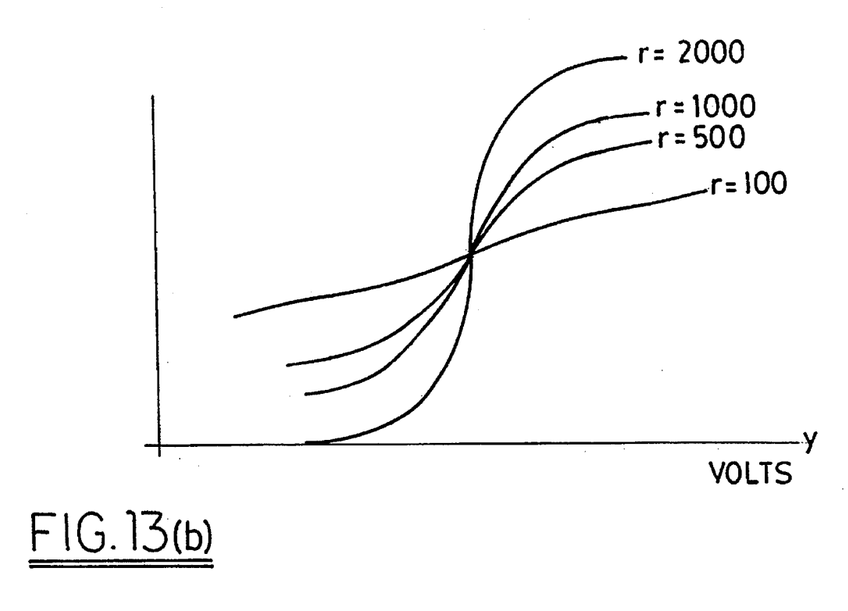
FIGS. 13(b) and 13(c) depict implementations of a squashing coefficient and a threshold.
Figure 13C:
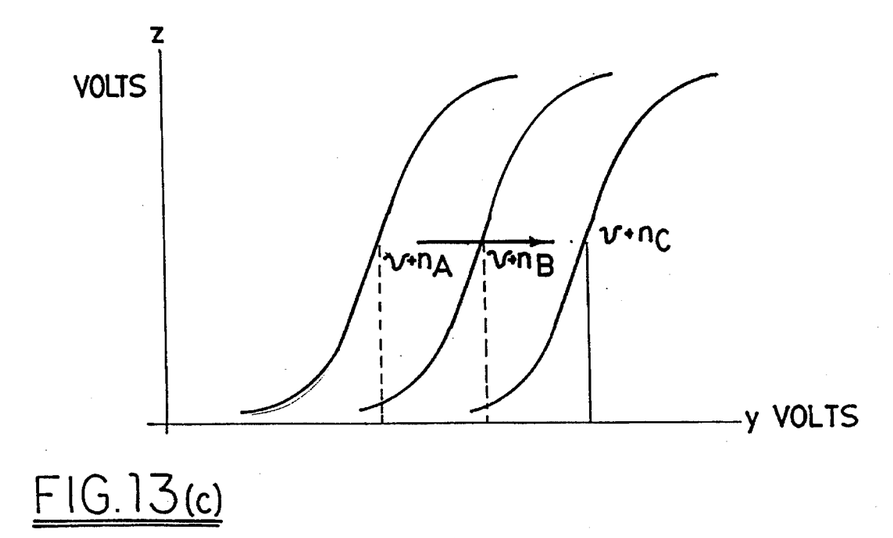

To convert the value to an analog value between 0 and 1, the following sigmoid function is employed:

$$z = f(y) = \frac{1}{1 + e^{-k(y-\varepsilon)}}$$

where k is a squashing coefficient, and θ is a threshold value. The squashing coefficient, k, is a value that controls the slope of the function; large values of k squash the function. If k becomes infinitely high, the function becomes a hard limiting function. The threshold value, θ, of the sigmoid controls the position of the center of the function. The squashing coefficient and threshold can be implemented as shown in FIGS. 13(b) and (c) by the circuit shown in FIG. 13(a). The sigmoid is a thresholding function which produces an analog value between 0 and 1 in response to values of y. The characteristic curves for the hard limiting function and the sigmoid function are shown in FIG. 3(a) and 3(b), respectively.

To examine the decision boundary of a complex weight network, it is assumed that the output function is a hard-limiting function with a threshold of θ. Therefore, the decision boundary can be obtained by the equation $y-\theta=0$ This equation can be written into matrix form using equation (2)

$$x'Cx + Kx \; \phi+ = 0 \quad (3)$$

where, $$X = \begin{bmatrix} x_1 \\ x_2 \\ \cdot \\ \cdot \\ \cdot \\ x_n \end{bmatrix}, C = \begin{bmatrix} a_1^2 + b_1^2 & a_1a_2 + b_1b_2 & \ldots & a_1a_n + b_1b_n \\ a_1a_2 + b_1b_2 & a_2^2 + b_2^2 & \ldots & a_2a_n + b_2b_n \\ \cdot & \cdot & & \cdot \\ \cdot & \cdot & & \cdot \\ \cdot & \cdot & & \cdot \\ a_1a_n + b_1b_n & a_2a_n + b_2b_n & \ldots & a_n^2 + b_n^2 \end{bmatrix}$$

$$K = [2(a_oa_1 + b_ob_1) \; 2(a_oa_2 + b_ob_2) \ldots 2(a_oa_n + b_ob_n)],$$

and $\phi = a_o^2 = b_o^2 - \theta$

If $a_1^2+b_1^2, \ldots, a_n^2+b_n^2$ are not all zero, (3) is a quadratic equation in n-space. Therefore, it is clear that the decision boundaries obtained from the complex weight neural networks are hyperquadrics. The details of the hyperquadrics are further analyzed by means of a discriminant, $\delta$. For example, the discriminant of a two-dimensional space is $\delta=(a_1b_2-a_2b_1)^2$. Hence, the decision boundary of a two-input complex weight neural network can be either elliptic (if $\delta>0$) or parabolic (if $\delta=0$). Similarly, the discriminant, in three-dimensional space is $$\delta = \begin{bmatrix} a_1^2 + b_1^2 & a_1a_2 + b_1b_2 & a_1a_3 + b_1b_3 \\ a_1a_2 + b_1b_2 & a_2^2 + b_2^2 & a_2a_3 + b_2b_3 \\ a_1a_3 + b_1b_3 & a_2a_3 + b_2b_3 & a_3^2 + b_3^2 \end{bmatrix}$$

Note that for $\delta=0$, at least one of the roots of the equation is zero. Therefore, the decision boundary of the three-input network is either elliptic paraboloid or hyperbolic paraboloid based on the complex weight's.

The choice of weights $w_1$ and $w_2$ in the implementation of the XOR as shown in FIG. 1, can be made analytically or by training (discussed later). To determine the values analytically, it must first be noted that inputs $x_1$ and $x_2$ will be either logical 1 or logical 0. Thus, whether or not the proper XOR result, z, is returned after thresholding depends upon the assignment of proper weights $w_1$ and $w_2$. The truth table for the XOR function is shown in Table 1. (It is assumed that y=z, the threshold result, for purposes of this analysis.)

TABLE 1

| $x_1$ | $x_n$ | y = z |
|---|---|---|
| 0 | 0 | 0 |
| 0 | 1 | 1 |
| 1 | 0 | 1 |
| 1 | 1 | 0 |

Solving equation (2) for the values of y shown in Table 1, it can readily be seen that: y=0 when $x_1=x_2=0$. Solving for $x_1=1$, $x_2=0$ and y=1, then $$a_1^2+b_1^2=1.$$

If $x_1=0$, $x_2=1$ and y=1, then $$a_2^2+b_2^2=1.$$

If $x_1=x_2=1$ and y=0, then $$(a_1+a_2)^2+(b_1+b_2)^2=0.$$

Assuming $a_1$, $a_2$, $b_1$ and $b_2$ are real numbers, then $$a_1=-a_2$$

$$b_1=-b_2.$$

One possible solution is $$w_1=a_1+jb_1=\sqrt{2}/2j\sqrt{2}/2,$$

$$w_2=a_2+jb_2=-\sqrt{2}/2-j\sqrt{2}/2.$$

For the two-input network which implements the XOR function, shown in FIG. 2, the output y resulting from the application of these complex weights (i.e., substituting $w_1$ and $w_2$ into equation. (2)) is $$y=(x_1-x_2)^2.$$

The preceding discussion shows that the proper complex weights can be determined analytically. The proper weights can also be obtained by iteratively training the neural network to deliver a desired result for a given set of inputs. Training involves the adjustment of weights based upon resultant outputs of prior training iterations. The training of the complex weight neural network circuit of the present invention can be carried out in a manner similar to conventional gradient descent and error back-propagation methods. Based on the proposed neural network, the output of the neuron 4 is represented as follows.

$$\begin{aligned} y = & (a_1^2 + b_1^2)x_1^2 + (a_2^2 + b_2^2)x_2^2 + \\ & \ldots + (a_n^2 + b_n^2)x_n^2 \\ & + 2(a_1a_2 + b_1b_2)x_1x_2 + 2(a_1a_3 + b_1b_3)x_1x_3 + \\ & \ldots + 2(a_1a_n + b_1b_n)x_1x_n \\ & + 2(a_1a_3 + b_2b_3)x_2x_3 + \\ & \ldots + 2(a_2a_n + b_2b_n)x_2x_n \\ & \cdot \\ & \cdot \\ & \cdot \\ & + 2(a_{n-1}a_n + b_{n-1}b_n)x_{n-1}x_n \end{aligned}$$

The error function, $E_p$, is defined to be proportional to the square of the difference between the target output, $t_p$, and the actual output, $z_p$, for each of the patterns, p, to be learned.

$$E_p = \frac{1}{2}(t_p - z_p)^2$$

To see the change of output with respect to the change of weight, partial derivatives of neuron output $y_p$ with respect to real weight $a_m$ and imaginary weight $b_m$, where m–1, . . . , n, can be represented by $$\frac{\partial y_p}{\partial a_m} = 2x_m \sum_{j=1}^{n} x_j a_j$$

and $$\frac{\partial y_p}{\partial b_m} = 2x_m \sum_{j=1}^{n} x_j b_j$$

respectively. Then, the partial derivatives of the sigmoid output, z, with respect to real and imaginary weights are represented by $$\frac{\partial z_p}{\partial a_m} = \frac{\partial z_p}{\partial y_p} \frac{\partial y_p}{\partial a_m} = 2kz_p(1-z_p)x_m \sum_{j=1}^{n} x_j a_j \quad (4)$$

and $$\frac{\partial z_p}{\partial b_m} = \frac{\partial z_p}{\partial y_p} \frac{\partial y_p}{\partial b_m} = 2kz_p(1-z_p)x_m \sum_{j=1}^{n} x_j b_j \quad (5)$$

respectively. The changes of the error with respect to the change of the real and imaginary weights are $$\frac{\partial E_p}{\partial a_m} = \frac{\partial E_p}{\partial z_p} \frac{\partial z_p}{\partial a_m} = -\epsilon_p \frac{\partial z_p}{\partial a_m}$$

and $$\frac{\partial E_p}{\partial b_m} = \frac{\partial E_p}{\partial z_p} \frac{\partial z_p}{\partial b_m} = -\epsilon_p \frac{\partial z_p}{\partial b_m}$$

where, $\epsilon_p = t_p - z_p$. Then, the changes of the real and imaginary weights for each training epoch can be represented by $$\Delta a_m = \sum_p g\epsilon_p \frac{\partial z_p}{\partial a_m}$$
$$= \sum_p 2gk\epsilon_p z_p(1-z_p)x_m \sum_{j=1}^{n} x_j a_j$$

and $$\Delta b_m = \sum_p g\epsilon_p \frac{\partial z_p}{\partial b_m}$$
$$= \sum_p 2gk\epsilon_p z_p(1-z_p)x_m \sum_{j=1}^{n} x_j b_j$$

where g is a gain factor.

Since the partial derivative of the sigmoid output, z, with respect to each weight is a function of the input and the weight, as shown in equations (4) and (5), the multiplication of the error and the partial derivatives, $\epsilon_p(\partial z_p/\partial a_m)$ and $\epsilon_p(\partial z_p/\partial b_m)$, will maintain proper training. In other words, a positive $\epsilon_p$ means that the actual output is smaller than the target value, and vice versa. A positive $\partial z_p/\partial a_m$ means that the output change will be positive proportional to the change of weight, and vice versa. For example, if $\epsilon_p<0$ and $\partial z_p/\partial a_m 0$, then the result of the multiplication, $\epsilon_p(\partial z_p/\partial a_m)$ is negative, and eventually $a_m$ will be reduced. Training of a multi-layer network can be performed in the same manner as the conventional back-propagation method, which is described in D. Rumelhart, G. E. Hinton and R. J. Williams, "Learning Internal Representations by Error Propagation," in D. Rumelhart and J. McClelland, Parallel Distributed Processing: Explanations in the Microstructure of Cognition, Vol. 1: *Foundations*, Chap. 8., MIT Press, 1986, incorporated herein by reference.

If the weights $w_1$ and $w_2$ have been properly selected, signal y will be proportional to either a 1 or 0, depending on the values of inputs $x_1$ and $x_2$. Because the values of y corresponding to either logical 1 or 0 may not be equal for various input combinations, a thresholding means 6, which implements a threshold function is used to produce uniform output signals z. That is, thresholding means 6, which preferably is a magnitude comparator, produces one of two different output signals depending upon whether its input falls above or below a threshold level. Various implementations of the threshold functions can be found in C. Mead, *Analog VLSI and Neural Systems*, Addison Wesley, 1989, and "Digital Design Fundamentals" by K. J. Breedings, 2nd ed., Prentice Hall, 1992, pp. 308–322.

In addition to XOR, the non-linearly separable function XNOR can be implemented using a neural network in accordance with the present invention by using a threshold function to invert the output of the XOR.

A single layer neural network using complex weights can also be used to implement linearly separable functions. This capability is useful so that production costs for a neural network can be minimized, since all functions can be performed with identical hardware. Distinct functions can be performed by altering the applied weights. Examples 1–4 illustrate the implementation of various linearly separable functions through the use of single-layer neural networks with complex weights. Examples 5–7 are additional examples of non-linearly separable functions.

EXAMPLE 1: NAND

Figure 8:
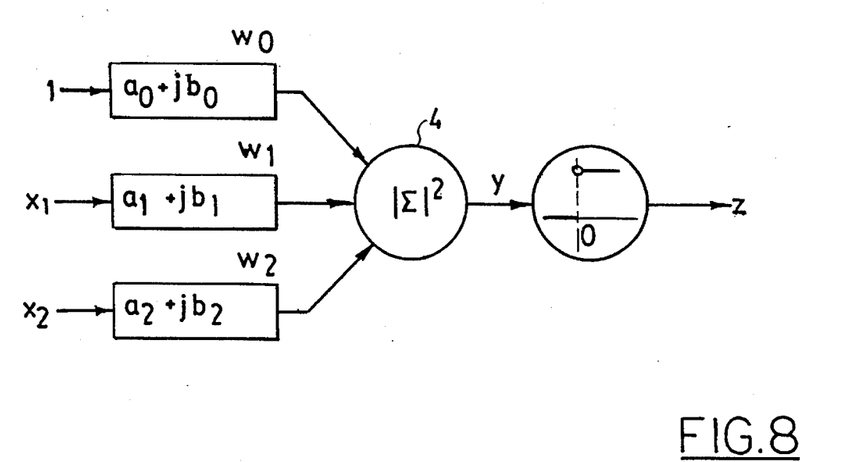
FIG. 8 is a generalized block diagram of a neural network in accordance with the present invention, employing an input offset signal.

The single layer neural network using complex weights can be used to perform the NAND operation, as well. The NAND operation requires that an input offset, $w_o = a_o + jb_o$, be applied to neuron body 4, as shown in FIG. 8. Thus, $$\begin{aligned} y &= |w_1 x_1 + w_2 x_2 + W_o|^2 \\ &= |(a_1 + jb_1)x_1 + (a_2 + jb_2)x_2 + (a_o + jb_o)|^2 \\ &= |(a_1 x_1 + a_2 x_2 + a_o) + (b_1 x_1 + b_2 x_2 + b_o)j|^2. \end{aligned}$$

Transforming, $$y = (a_1 x_1 + a_w x_2 + a_o)^2 + (b_1 x_1 + b_2 x_2 + b_o)^2. \quad (6)$$

in the NAND function, the output $y=1$, when $x_1 = x_2 = 0$. Solving, $$a_o^2 + b_o^2 = 1.$$

This is a unit circle in the complex plane, therefore, the input bias can be assumed to be $$w_o = 1.$$

Solving equation (6) with $W_o = 1$: yields the following possible solutions:

$$a_1 = -\tfrac{1}{2},\ b_1 = -\sqrt{3}/2,\ a_2 = -\tfrac{1}{2},\ \text{and}\ b_2 = \sqrt{3}/2.$$

If we assume $W_o = -1$, solving equation (6) yields the following possible result:

$$a_1 = \tfrac{1}{2},\ b_1 = \sqrt{3}/2,\ a_2 = \tfrac{1}{2},\ \text{and}\ b_2 = -\sqrt{3}/2.$$

EXAMPLE 2: OR

Solving equation (2) for the inputs and results of the OR operation yields the following possible weights for achieving the OR operation:

$$a_1=\frac{1}{2},\ b_1=\sqrt{3}/2,\ a_2=\frac{1}{2}\ \text{and}\ b_2=-\sqrt{3}/2.$$

EXAMPLE 3: AND

The AND function, shown in Table 2, can be implemented using a single layer neutral network with complex weights.

TABLE 2

| $x_1$ | $x_n$ | y |
|---|---|---|
| 0 | 0 | 0 |
| 0 | 1 | 0 |
| 1 | 0 | 0 |
| 1 | 1 | 1 |

To achieve this operation, an output offset or threshold, $\theta$, can be applied to the output signal y in addition to an input offset $W_o$. Output offset, $\theta$, added to both sides of equation (2), yields:

$$y+\theta=(a_1x_1+a_2x_2+a_o)^2+(b_1x_1+b_2x_2+b_o)^2\ \theta$$

Solving for the inputs $x_1$ and $x_2$ shown in Table 2, yields

For $x_1=x_2=0$, $$a_o^2+b_o^2+\theta=0;$$

for $x_1=0$ and $x_2=1$, $$(a_2=a_o)^2-(b_2+b_o)^2+\theta=0.$$

Substituting, $a_2^2+2a_2a_o+2b_2b_o=0$.

For $x_1=1$ and $x_2=0$, $$(a_1+a_o)^2+(b_1+b_o)^2+\theta=0.$$

Substituting, $$a_1^2+2a_1a_o+b_1^2+2b_1b_o=0.$$

For $x_1=x_2=1$, $$(a_{1+}a_2+a_o)^2+(b_1+b_2+b_o)^2+\theta=1.$$

Substituting, $$a_1a_2+b_1b_2=+e, \text{fra}\ 2+ee$$

One of the solutions may be $$a_o=-\frac{1}{2},\ b_o=0,\ a_1=b_1=a_2=b_2=\frac{1}{2},\ \text{and}\ \theta=-\frac{1}{4}.$$

Figure 9:
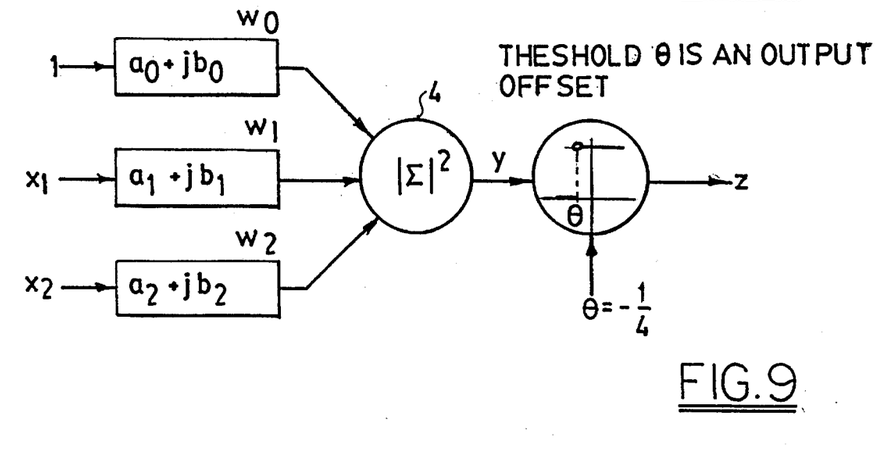
FIG. 9 is a block diagram of a neural network in accordance with the present invention, employing an input and an output offset or threshold, θ.

FIG. 9 shows a block diagram of the implementation an AND operation.

EXAMPLE 4: INVERTER

The performance of the inverter operation can be accomplished by application of an input offset signal. This input offset will result in an output of logical 1 when the input signal, x, is 0. This can be shown with reference to the following equation:

$$y=|w_1x_1+w_o|^2=|a_1x_1+jb_1x_1+a_ojb_o|^2=|(a_1x_1+a_o)+j(b_1x_1+b_o)|^2.$$

Taking the sum of the squares, yields $$y=(a_1x_1+a_o)^2+(b_1x_1+b_o)^2.$$

The expected output, y, with input x=0, is 1. Substituting x=0 into the above equation, yields $$a_o^2+b_o^2=1.$$

This is a unit circle in the complex plane. Therefore, the input offset can be selected arbitrarily to be $$W_o=\pm 1$$

The expected output, y, for an input x=1, is 0. Therefore, substituting in the above equation x=1 yields:

$$(a_1+a_o)^2+(b_1+b_o)^2=0,$$

which yields $$a_1=-1,\ b_1=0,\ if\ W_o=1,\ or$$

$$a_1 1=1,\ b_1=0,\ if\ W_o=-1.$$

To summarize, $$w_1=-1,\ if\ W_o=1;\ and$$

$$w_1=1,\ if\ W_o=-1.$$

Figure 10A:
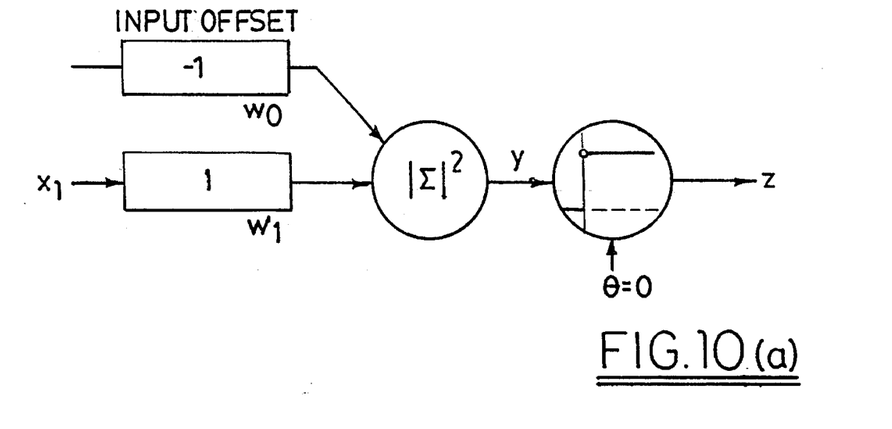
FIG. 10(a), 10(b), and 10(c) are a block diagram of an inverter in accordance with the present invention.
Figure 10B:
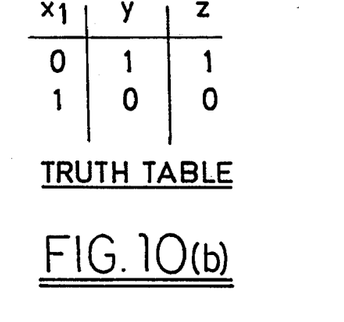
Figure 10C:
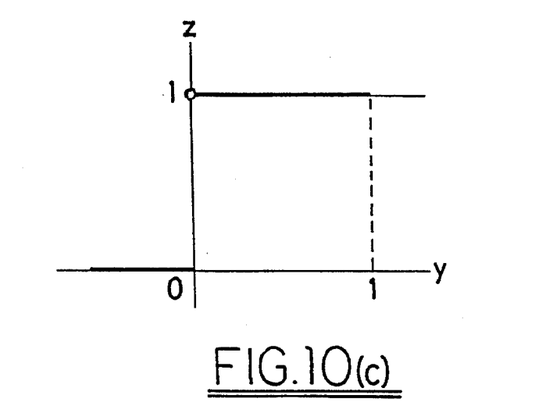

An implementation of the inverter is shown in FIGS. 10(a), (b), and (c). So far, implementation examples of linearly separable logical functions using the complex weights have been described. The solutions have been obtained analytically by solving the proper equations.

The next three examples show implementations of various non-linearly separable functions using complex weights. The solutions are obtained by training.

EXAMPLE 5—SYMMETRY

A four-input symmetry function, shown in Table 3, and a six-input symmetry function (not shown), can be performed by properly adjusting the complex weights and adding additional input circuitry.

TABLE 3

| $x_1$ | $x_2$ | $x_3$ | $x_4$ | y |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 1 |

TABLE 3-continued

| $x_1$ | $x_2$ | $x_3$ | $x_4$ | y |
|---|---|---|---|---|
| 0 | 1 | 0 | 0 | 1 |
| 0 | 1 | 0 | 1 | 1 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 1 |
| 1 | 0 | 1 | 1 | 1 |
| 1 | 1 | 0 | 0 | 1 |
| 1 | 1 | 0 | 1 | 1 |
| 1 | 1 | 1 | 0 | 1 |
| 1 | 1 | 1 | 1 | 0 |

Through training, it has been determined that the following complex weights will yield the four-input symmetry function shown in Table 3:

$w_1 = 0.8785 + j0.6065$ $w_2 = 0.0852 + j1.0676$ $w_3 = -0.0914 - j1.1862$ $w_4 = -1.0343 - j0.6850$.

Figure 4:
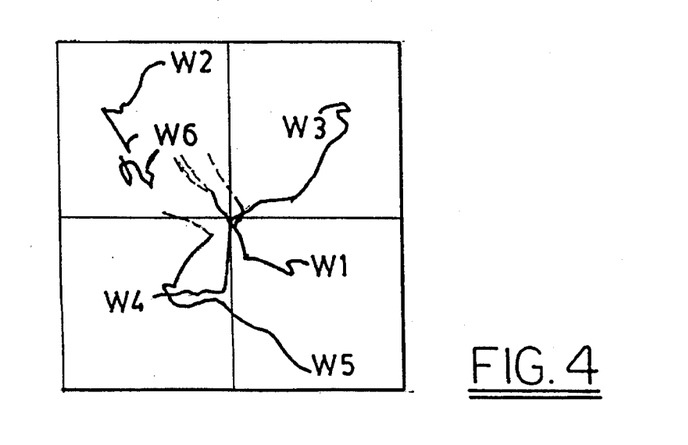
FIG. 4 is a graphical depiction of the values assigned as weights over the course of training a neural network circuit in accordance with the present invention to perform a six-input symmetry function.

A six input symmetry problem can also be obtained by training, as shown in FIG. 4. FIG. 4 shows the trajectory of each of the weights $w_1$–$w_6$ during training. Thus, an acceptable set of weights for performing the six-input symmetry function has been determined through training to be:

$w_1 = 0.5546 - j0.3157$ $w_2 = -0.6434 + j1.0052$ $w_3 = 0.6840 + j0.7378$ $w_4 = -0.5958 - j0.5930$ $w_5 = 0.5687 - j1.1013$ $w_6 = -0.6208 + j0.3433$

The four and six input symmetry operations can be implemented using a single layer neural network as shown in FIG. 6, with the number of inputs and synapses being either four or six.

EXAMPLE 6 ADD

A single layer neural network using complex weights can also be used to perform a portion of a two 2-byte input and single 3-byte output: summation problem. By using a single layer neural network With complex weights, the least significant bit of the sum can be obtained. Table 4 shows the inputs and desired outputs for this operation.

TABLE 4

| $x_1$ | $x_2$ | $x_3$ | $x_4$ | y |
|---|---|---|---|---|
| 0 | 0 | 0 | 0 | 0 |
| 0 | 0 | 0 | 1 | 1 |
| 0 | 0 | 1 | 0 | 0 |
| 0 | 0 | 1 | 1 | 1 |
| 0 | 1 | 0 | 0 | 1 |
| 0 | 1 | 0 | 1 | 0 |

TABLE 4-continued

| $x_1$ | $x_2$ | $x_3$ | $x_4$ | y |
|---|---|---|---|---|
| 0 | 1 | 1 | 0 | 1 |
| 0 | 1 | 1 | 1 | 0 |
| 1 | 0 | 0 | 0 | 0 |
| 1 | 0 | 0 | 1 | 1 |
| 1 | 0 | 1 | 0 | 0 |
| 1 | 0 | 1 | 1 | 1 |
| 1 | 1 | 0 | 0 | 1 |
| 1 | 1 | 0 | 1 | 0 |
| 1 | 1 | 1 | 0 | 1 |
| 1 | 1 | 1 | 1 | 0 |

Figure 5A:
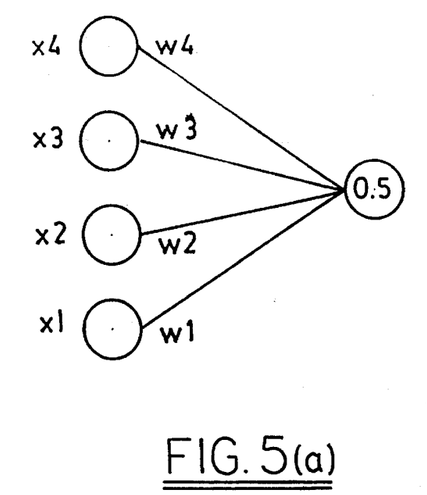
FIGS. 5(a) and (b) are alternative block diagrams of circuits for performing the operation of obtaining the least significant bit of the sum of two inputs.
Figure 5B:
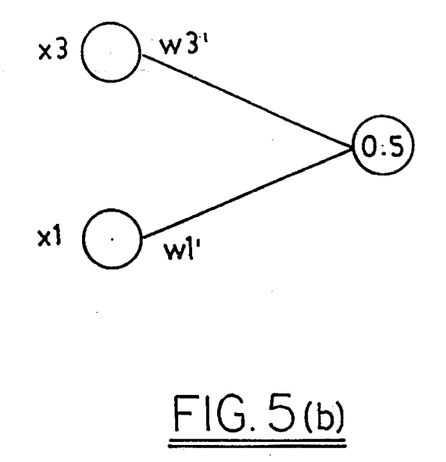

FIGS. 5(a) and (b) shows alternative block diagrams for performing this operation. FIG. 5(a) shows a four-input, single-layer neural network. FIG. 6 shows a generalized block diagram capable of implementing the four-input ADD operation. Through training it has been determined that a complex weighting combination which will yield the desired result for the ADD is:

$w_1 = 0.9724 - j0.3085$ $w_2 = 0.0261 - j0.0594$ $w_2 = 0.9576 + j0.3874$ $w_4 = 0.0499 + j0.2806$.

It should be noted that the four-input neural network for obtaining the least significant digit of the sum can be simplified to a two-input neural network, as shown in FIG. 5(b). This is so because the weights $w_2$ and $w_4$, determined through training, for inputs $x_2$ and $x_4$ of the neural network are negligible. Thus, the use of complex weights allows simplification of the four-input neural network to a two-input neural network in this case. The threshold values of the sigmoids in FIGS. 5(a) and 5(b) are each 0.5.

Figure 7:
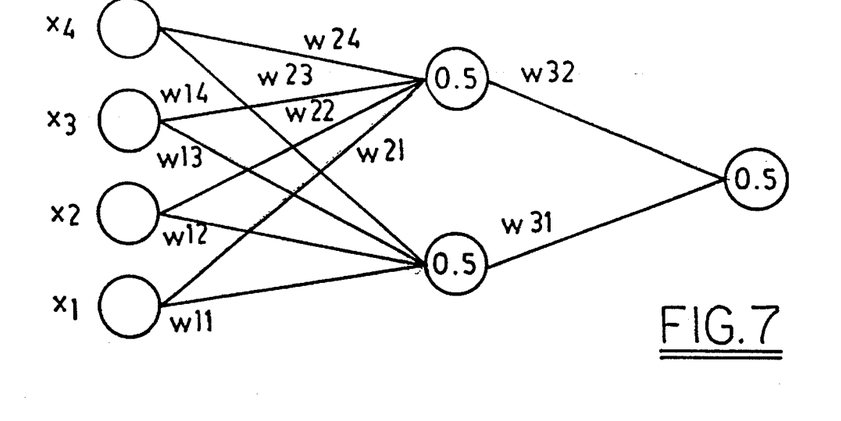
FIG. 7 is a block diagram of a two-layer neural network network for the second-least significant bit of the ADD operation.

To obtain the second byte of the addition result, a two-layer network is required, as shown in FIG. 7.

The circuit of the present invention is capable of implementing a quadrically separable function using a single layer. Because the function described in this example is not quadrically separable, two layers are required. Training of such a circuit can be done quickly using the training technique described above.

EXAMPLE 7: NEGATION

Figure 12:
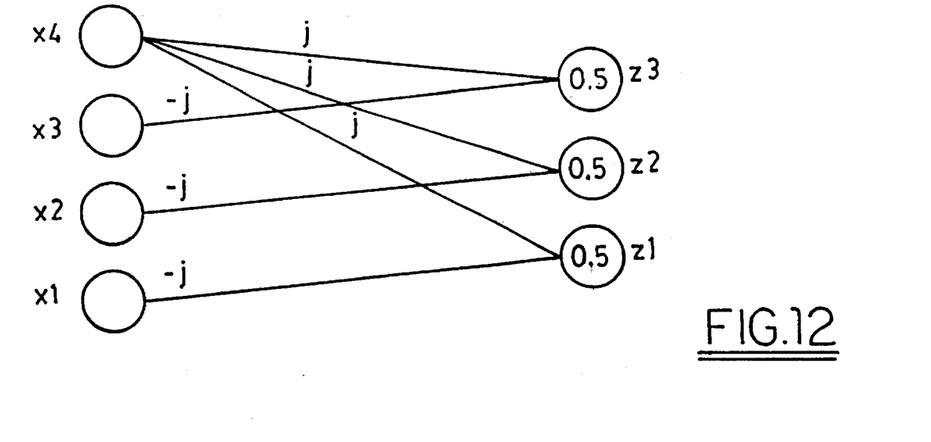
FIG. 12 is a block diagram of a 4-byte input and 3-byte output negation function.

A 4-byte input and 3-byte output negation function can also be performed by a single layer network, as shown in FIG. 12.

The truth table for this operation is shown as Table 5.

TABLE 5

| $x_4$, | $x_3$, | $x_2$, | $x_3$ | $z_3$, | $z_2$, | $z_1$ |
|---|---|---|---|---|---|---|
| 0 | 0 | 0 | 0 | 0 | 0 | 0 |
| 0 | 0 | 0 | 1 | 0 | 0 | 1 |
| 0 | 0 | 1 | 0 | 0 | 1 | 0 |
| 0 | 0 | 1 | 1 | 0 | 1 | 1 |
| 0 | 1 | 0 | 0 | 1 | 0 | 0 |
| 0 | 1 | 0 | 1 | 1 | 0 | 1 |
| 0 | 1 | 1 | 0 | 1 | 1 | 0 |

TABLE 5-continued

| $x_4$, | $x_3$, | $x_2$, | $x_3$ | $z_3$, | $z_2$, | $z_1$ |
|---|---|---|---|---|---|---|
| 0 | 1 | 1 | 1 | 1 | 1 | 1 |
| 1 | 0 | 0 | 0 | 1 | 1 | 1 |
| 1 | 0 | 0 | 1 | 1 | 1 | 0 |
| 1 | 0 | 1 | 0 | 1 | 0 | 1 |
| 1 | 0 | 1 | 1 | 1 | 0 | 0 |
| 1 | 1 | 0 | 0 | 0 | 1 | 1 |
| 1 | 1 | 0 | 1 | 0 | 1 | 0 |
| 1 | 1 | 1 | 0 | 0 | 0 | 1 |
| 1 | 1 | 1 | 1 | 0 | 0 | 0 |

As can be seen from the block diagram of FIG. 12, the negation operation can be performed by XOR'ing the input $x_4$ with each of the inputs $x_1$, $x_2$ and $x_3$. The three bit output, $z_1$, $z_2$, $z_3$, is the result of these XOR operations. Through training, it has been determined that the complex weights $w_1=w_2=w_3=-j$ and $w_4=j$ can be used to perform the negation operation.

From the foregoing description, it will be apparent that there has been provided an improved single layer neural network. While the above method and apparatus have been described with reference to the functions described in the examples, other variations and modifications in the herein described system, within the scope of the invention, will undoubtedly suggest themselves to those skilled in the art. Accordingly, the foregoing description should be taken as illustrative and not in a limiting sense.

We claim:

1. A method for performing a non-linearly separable operation off three or more input electrical signals, comprising the steps of:

receiving said input electrical signals in a single artificial neuron circuit;

weighting said input electrical signals with one or more complex weights to produce weighted signals, said complex weights each having a real component with a scalar value and an imaginary component with a scalar value, the scalar values of said real and imaginary components determining a type of nonlinearly separable operation on said three or more input electrical signal; and generating an output electrical signal representative of the results of the non-linearly separable operation performed on said input electrical signals.

2. The method according to claim 1, further comprising the step of:

thresholding said output signal to produce a signal equal either to logical 1 or to logical 0.

3. The method according to claim 4, wherein said weighting comprises forming one or more first signals proportional to the product of said input electrical signals and the scalar value of each of said real components and one or more second signals proportional to the product of said input signals and the scalar values of each of said imaginary components.

4. The method according to claim 3 further compromising:

adding said first signals to produce added first signals;

adding said second signals to produce added second signals;

squaring said added first signals to produce a first squared signal;

squaring said added second signals to produce a second squared signal; and adding said first and second squared signals to yield said output signal.

5. The method according to claim 1 wherein said predetermined logical process is exclusive OR.

6. The method according to claim 1 wherein said predetermined logical process is symmetry.

7. The method according to claim 1 wherein said predetermined logical process is NAND.

8. The method according to claim 1 wherein said predetermined logical process is OR.

9. The method according to claim 1 wherein said predetermined logical process is INVERTER.

10. The method of claim 1 wherein the complex weights have positive and negative values.

11. A single layer, single neuron, neural network circuit for performing a non-linearly separable predetermined logical process on one or more input signals comprising:

means for applying the scalar values of the components of a predetermined complex weight to said one or more input signals to produce one or more weighted input signals, said predetermined complex weight being chosen so as to cause said circuit to perform the predetermined logical process;

means for adding said weighted input signals to produce a composite input signal;

means for squaring said composite input signal to produce a squared signal; and means for thresholding said squared signal to produce an output signal representing the predetermined logical process.

12. The neural network according to claim 11, wherein said logical operation is quadrically separable.

13. The neural network circuit according to claim 11, wherein said predetermined logical process is an exclusive-or function.

14. A circuit for performing an exclusive-OR process on first and second electrical signals and outputting a resultant exclusive-OR electrical signal, comprising:

first and second input means for applying said first and second electrical signals to said circuit;

multiplying means for electrically multiplying said applied first and second signals by first and second complex weighting signals, respectively, to produce first and second weighted inputs said complex weights being chosen to perform an exclusive-OR process on said input electrical signals;

summing means for electrically adding said first weighted input to said second weighted input to produce a sum signal; and squaring means for electrically squaring said sum signal to produce said resultant exclusive-OR signal.

15. The circuit according to claim 14 wherein said first and second complex weighting signals represent the magnitudes of the real and imaginary portions of first and second complex numbers.

* * * * *